Figure 1:
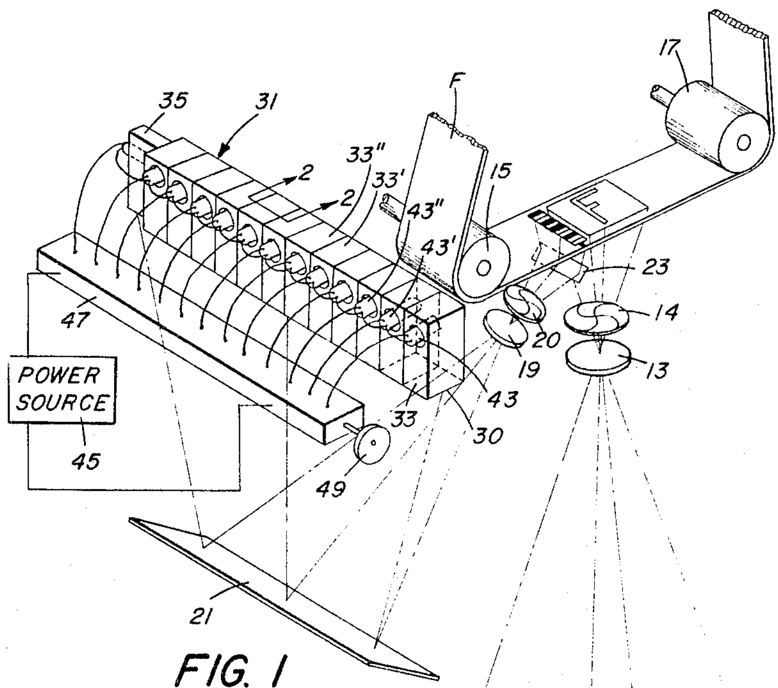

DEVICE FOR FORMING VISUAL CODE PATTERNS

Filed Dec. 23, 1963

JOHN E. MORSE
LEONARD J. SEABERG
INVENTORS

BY R. Frank Smith
Paul R. Holmes
ATTORNEYS

United States Patent Office 3,282,176
Patented Nov. 1, 1966

3,282,176
DEVICE FOR FORMING VISUAL CODE PATTERNS

John E. Morse and Leonard J. Seaberg, Rochester, N.Y., assignors to Eastman Kodak Company, Rochester, N.Y., a corporation of New Jersey Filed Dec. 23, 1963, Ser. No. 332,545
6 Claims. (Cl. 95—1.1)

The present invention relates to a coding device and more particularly to a device for producing a visual code pattern suitable for recording on photographic film.

The use of microfilm for storage and retrieval of information has increased substantially in recent years. This is in part attributable to the seemingly inevitable accumulation of large and relatively unwieldy paper files of information by modern business and the desire to reduce the storage space required therefor. However, in addition, recent developments in copying apparatus and methods have greatly facilitated the recording of such information on microfilm and with some of the newer film readers the search and retrieval of information is greatly simplified, even to the extent of enabling one to obtain hard copy photographic prints of selected information at the touch of a button. The use of visual code index lines recorded between or along side of recorded images on the film provides one means for locating any given image bearing section of a strip of film as the film is moved through a film reader. The recording of binary code images which identify the information bearing images or content thereof and which are located adjacent to such information images greatly speeds the retrieval of information. Prior to the present invention the known devices capable of forming code patterns suitable for photographic recording have been of a relatively complicated nature and are costly to maintain and use, particularly from the viewpoint of the smaller businesses. The code pattern device of the present invention has been devised with a view towards facilitating the recording of code patterns on photographic film and comprises a compact unit capable of forming selected visual code patterns of light which can be conveniently recorded on photographic media adjacent and prior in time to an information bearing image to which the code pattern relates.

One object of the present invention is therefore to provide a device for forming a photographically recordable pattern.

Another object of the present invention is to provide a code pattern producing device for forming preselected light patterns in a predetermined plane.

Yet another object of the present invention is to provide a device capable of forming sharply defined adjacent lighted and unlighted areas, the lighted area having uniform light distribution therein.

Figure 2:
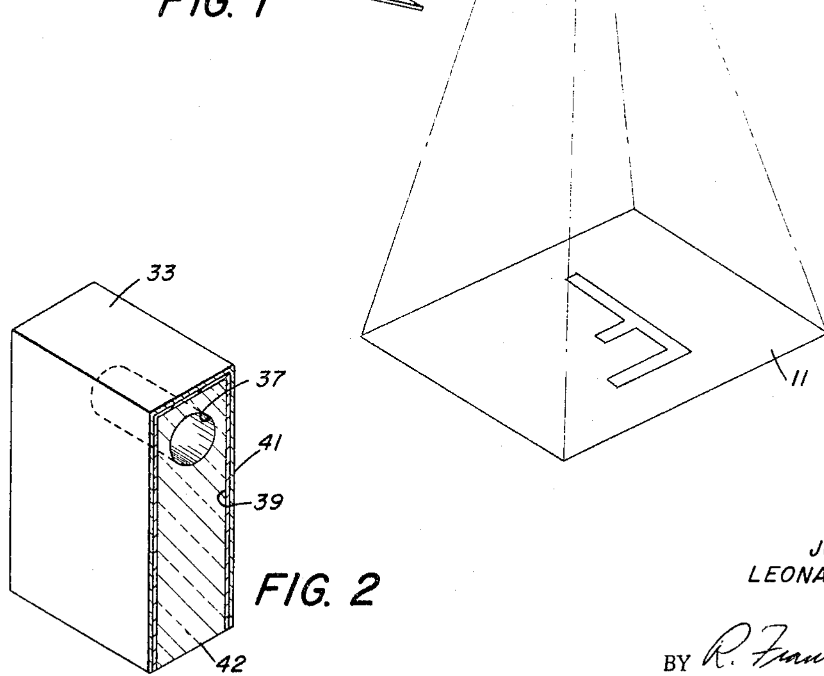

Still other objects and advantages of the present invention will become readily apparent to those skilled in the art from the following description with reference to the drawings in which like characters denote like parts and wherein:

FIGURE 1 is a view, partially schematic in form, illustrating the visual code pattern producing device of the present invention; and FIGURE 2 is a section view taken along line 2—2 of FIGURE 1 showing one of the individual elements of the device.

In FIGURE 1 the visual code pattern producing device of the present invention is illustrated as it could be incorporated in a photographic document copying apparatus. The document copying apparatus is schematically shown to simply the description of the present invention. The numeral 11 designates an information bearing object, for example, a document which is to be photographed. The document is disposed in the focal plane of the lens 13 of a planetary type microfilmer film unit. Shutter 14 of the film unit controls image exposure through lens 13. The film unit has a pair of film feed rollers 15 and 17 about which the unexposed photosensitive microfilm F is guided during movement by a drive mechanism not shown. A lens 19 is arranged in the film unit in front of a shutter 20 to transmit images received from mirror 21 onto mirror 23 and to focus such images on the film F. Mirror 21 is supported in the apparatus in optical alignment with the planar end surface 30 of visual code pattern producing device 31 of the present invention. As will hereinafter be described, images of the pattern or patterns and the document or documents to which such patterns relate are exposed in sequence and in side by side relation on the film F.

The code pattern device 31 is formed of a plurality of blocks 33, 33′, 33″, etc., which are arranged in side by side relation. In the preferred embodiment illustrated in FIGURE 1 the blocks 33, 33′, 33″, etc., are similar both in size and shape; however, in any specific apparatus the shapes could be varied to fulfill a special requirement without departing from the novel concept herein disclosed. Block 35, though similar to blocks 33, 33′, 33″, etc., is narrower and is arranged at the right angles to and on the end of the row of blocks 33, 33′, 33″, etc. The blocks are secured together by means of an adhesive to form a unitary structure. Alternatively, other means such as a clamp or retaining housing can be used to hold the blocks. Each block is formed of a light-conducting material and preferably of a light conducting material which provides good light diffusion. Plexiglas IIW2159FS manufactured by Rohm & Haas Co. has been found to be a very satisfactory material for the blocks. Each block is drilled to provide a bore 37 which extends into the interior of (but not through) the block and which is of a diameter sufficient to receive and hold a small lamp. The outside surface of the blocks is covered with a light-reflective coating 39 such as, for example, an aluminized paint. A coating 41 is preferably applied over coating 39 to protect the light reflective coating, black lacquer, if selected for coating 41 has the further advantage of supplementing the light reflective ability of coating 39 on the surface of the blocks. Coatings 39 and 41 are applied over the exterior surface of each block except for the bottom end 42 which forms the planar surface 30 of the device. The interior of the blocks, i.e., bore 37, should not be coated. For best results, we prefer to polish end 42 to form a smooth planar surface 30 for device 31.

Within the bore in each block 33, 33′, 33″, etc., and 35, a small incandescent lamp 43, 43′, 43″, etc., is inserted. These lamps, preferably grain of corn lamps as referred to in the trade, are connected to a source of power 45 through a switching mechanism designated by the numeral 47. The switching mechanism 47 is of a conventional and well-known construction and serves the function of energizing any one or combination of lamps as selected by the operator. The lamp within block 35 is always energized in any combination with the other lamps and the recorded image of block 35 is used as a code reading timing mark in automatic look-up readers in which the film is viewed. In FIGURE 1 this facility for energized combinations of lamps is schematically illustrated by means of the knob which through internal switching would permit one to manually select any one or combination of lamps to be energized. Of course, the switching mechanism can be automatically controlled by means of a punched card reading apparatus, magnetic tape, or other electronic data processing apparatus. Techniques for accomplishing this control are known in the art and will not be described in detail herein. In any event, because of the characteristics of the material of which the blocks are formed and because of the coatings on the exterior surfaces of the blocks, the end 42 of any block in which a lamp is energized is uniformly illuminated and the light from such a lamp is confined to that block by the coatings. Consequently, a sharply defined pattern is presented on end surface 30 suitable for photographic recording purposes.

The drive mechanism, referred to above, feeds the film F with intermittent movement through the focal planes of the lenses 13 and 19 of the film unit. When the film is correctly positioned for recording an image of a code pattern formed by the end surface 30 of device 31, shutter 20 is opened and the exposure takes place. If several code patterns are required, shutter 20 and the feed mechanism can be repeatedly actuated in proper sequence to advance the film the distance required for each column image and to expose such image on the film so that the columns of adjacent recorded code pattern images appear in side by side non-overlapping relation to each other. Thereafter, the feed mechanism is controlled to advance the film sufficiently to position an unexposed section in the focal plane of lens 13 so that upon actuating shutter 14 an image of the information bearing object is recorded on the film in side by side non-overlapping relation to the last recorded code pattern image.

It will now be appreciated that the code pattern producing device of the present invention provides a sharply defined visual pattern in which the light areas are uniformly illuminated. While the device has been described in connection with a photographic recording apparatus, other uses for the device will be apparent to those skilled in the art. For example, it could be used for code comparison purposes, i.e., in comparators.

The invention has been described in considerable detail with particular reference to certain preferred embodiments thereof, but it will be understood that variations and modifications can be effected within the spirit and scope of the invention as described hereinabove, and as defined in the appended claims.

Having now particularly described our invention what we desire to secure by Letters Patent of the United States and what we claim is:

1. A device for forming a code pattern of uniformly illuminated, high intensity code targets to be photographically recorded, comprising:

(a) a plurality of solid blocks of substantially homogeneous translucent material, each block having a cavity therein for receiving a lamp;

(b) a light reflective coating substantially covering the exterior surface of each of said blocks except for at least a portion of one end which defines the code target;

(c) means for mounting the blocks in a side by side relation with at least a part of said uncoated portion of each block disposed in a common plane, (d) whereby upon selectively energizing lamps disposed within said cavities a sharply defined code pattern is formed.

2. A device in accordance with claim 1 wherein said coating comprises a layer of reflective material coated on said blocks and a layer of opaque material coated on said reflective layer for protecting the same and to provide an improved light barrier.

3. A device in accordance with claim 2 wherein said translucent material is plastic, said reflective layer is aluminized and said opaque layer is black lacquer.

4. A device in accordance with claim 1 wherein said uncoated portion of each of said blocks is polished to form a smooth surface.

5. A device in accordance with claim 1 wherein said uncoated portion of said one end is planar and said cavity comprises a longitudinal bore extending into said block and having its longitudinal axis spaced from and substantially parallel to said uncoated portion.

6. A device for forming a code pattern of uniformly illuminated, high intensity code targets to be photographically recorded comprising:

(a) a plurality of solid blocks of substantially homogeneous translucent plastic material, each block having a longitudinal bore open on one side thereof and extending into said block, the longitudinal axis of said bore being remotely spaced from and substantially parallel to one planar end of said block, (b) a light reflective coating comprising an aluminized reflecting layer with an opaque protective layer thereover, said coating substantially covering the exterior surface of each of said blocks except for at least a portion of said one planar end which end is polished and defines the code target, (c) means for mounting the blocks in a side by side relation with said uncoated portion of each block disposed in a common plane; and (d) selectively energizable light sources disposed within said longitudinal bores (e) whereby, upon selectively energizing said light sources disposed within said bores, a well defined planar code pattern is formed.

References Cited by the Examiner

UNITED STATES PATENTS

| | | | |
|---|---|---|---|
| 1,801,458 | 4/1931 | Satterlee | 88—24 |
| 1,826,664 | 10/1931 | Hopkins | 88—24 |
| 2,368,839 | 2/1945 | Jansen | 95—1.1 |
| 2,907,985 | 10/1959 | Doersam | 95—1.1 |
| 2,992,587 | 7/1961 | Hicks | 240—1 |
| 2,998,597 | 8/1961 | Edwards | 240—1 |

JOHN M. HORAN, *Primary Examiner.*